(12) United States Patent
Ren

(10) Patent No.: US 11,175,539 B1
(45) Date of Patent: Nov. 16, 2021

(54) LIQUID ALIGNMENT DEVICE

(71) Applicant: SHENZHEN CHINA STAR OPTOELECTRONICS SEMICONDUCTOR DISPLAY TECHNOLOGY CO., LTD., Shenzhen (CN)

(72) Inventor: Wei Ren, Shenzhen (CN)

(*) Notice: Subject to any disclaimer, the term of this patent is extended or adjusted under 35 U.S.C. 154(b) by 219 days.

(21) Appl. No.: 16/625,719

(22) PCT Filed: Dec. 13, 2019

(86) PCT No.: PCT/CN2019/125081
§ 371 (c)(1),
(2) Date: Dec. 22, 2019

(87) PCT Pub. No.: WO2021/109208
PCT Pub. Date: Jun. 10, 2021

(30) Foreign Application Priority Data

Dec. 2, 2019 (CN) .......................... 201911211548.X

(51) Int. Cl.
G02F 1/133 (2006.01)
G02F 1/1337 (2006.01)
G02F 1/13 (2006.01)
G02F 1/1362 (2006.01)

(52) U.S. Cl.
CPC ...... *G02F 1/133788* (2013.01); *G02F 1/1303* (2013.01); *G02F 1/136222* (2021.01); *G02F 1/133711* (2013.01)

(58) Field of Classification Search
CPC ......... G02F 1/133788; G02F 1/136222; G02F 1/1303; G02F 1/133711

USPC ......................................................... 349/124
See application file for complete search history.

(56) References Cited

U.S. PATENT DOCUMENTS

| | | | |
|---|---|---|---|
| 2006/0256258 A1 | 11/2006 | Kim et al. | |
| 2008/0171284 A1* | 7/2008 | Hull | B29C 64/106 430/252 |
| 2011/0157531 A1* | 6/2011 | Suwa | G02F 1/133788 349/124 |
| 2013/0180664 A1* | 7/2013 | Shiu | G02F 1/1303 156/378 |
| 2016/0011463 A1 | 1/2016 | Suwa et al. | |
| 2016/0181136 A1* | 6/2016 | Fujino | H01L 21/683 361/234 |

FOREIGN PATENT DOCUMENTS

| | | |
|---|---|---|
| CN | 102362218 A | 2/2012 |
| CN | 102375262 A | 3/2012 |
| CN | 103529599 A | 1/2014 |

(Continued)

*Primary Examiner* — Christopher M Raabe

(57) ABSTRACT

The present invention provides a liquid alignment device including: a stage configured to carry a liquid crystal display panel, wherein in the liquid crystal display panel a first substrate is placed on the stage; a curing light source configured to irradiate the first substrate; a probe configured to provide the first substrate with a voltage. The present invention employs a color resist layer disposed in a second substrate of the liquid crystal display panel to solve the issue that during liquid alignment the second substrate must be disposed on a lower place and the first substrate must be disposed on an upper place to prevent efficiency of the liquid alignment.

20 Claims, 7 Drawing Sheets

(56) References Cited

FOREIGN PATENT DOCUMENTS

| | | | |
|---|---|---|---|
| CN | 106707572 | A | 5/2017 |
| JP | 2000347189 | A | 12/2000 |
| JP | 2019008247 | A | 1/2019 |

* cited by examiner

LIQUID ALIGNMENT DEVICE

FIELD OF INVENTION

The present invention relates to a field of display technologies, especially relates to a liquid alignment device.

BACKGROUND OF INVENTION

A liquid crystal display (LCD) comprises a first substrate, a second substrate, and a liquid crystal and a sealant frame sandwiched between the first substrate and the second substrate. Vertical and horizontal thin and tiny electrical wires disposed between the first substrate and the second substrate, orientations of liquid crystal molecules are changed by voltage application and ultraviolet irradiation such that the liquid crystal molecules of the liquid crystal layer are orientated by a pretilt angle for achieving an objective of liquid alignment.

With reference to FIGS. 1 and 2, a conventional large size liquid crystal display panel 100 comprises a liquid crystal layer 1002, and a first substrate 1001 and a second substrate 1003 located respectively on two sides of the liquid crystal layer 1002. A color resist layer is disposed in the first substrate 1001. Ultraviolet light is irradiated from above to the liquid crystal display panel 100. A probe 102 is located on a side of the first substrate 1001 and exerts voltage U. To avoid the color resist layer from reacting with the ultraviolet light, the second substrate 1003 is disposed on a lower place and the first substrate 1001 is disposed on an upper place necessarily, which causes two sides of the liquid crystal display panel 100 to be sagged and curved, as shown in FIG. 2. Especially, a portion of the liquid crystal display panel 100 where the probe 102 is located has a maximum amount of deformation and is sunk, an orientation and a pretilt angle of liquid crystal nearby the sunk region are different in a certain extent, which affects display quality of the liquid crystal display panel.

As described above, during liquid alignment of the conventional large size liquid crystal display panel, ultraviolet light is absorbed by color resist in pixels to lower a production rate of the liquid crystal display panel and raise a manufacturing cost of the liquid crystal display panel. Due to a larger size, two ends of the liquid crystal display panel are sagged and curved. Especially, a portion of the liquid crystal display panel where the probe is located has a maximum amount of deformation and is sunk, an orientation and a pretilt angle of liquid crystal nearby the sunk region are different in a certain extent, which affects display quality of the liquid crystal display panel.

SUMMARY OF INVENTION

Technical Issue

The present invention provides a liquid alignment device able to solve the technical issue that due to a larger size, two ends of the liquid crystal display panel are sagged and curved, and especially, a portion of the liquid crystal display panel where the probe is located has a maximum amount of deformation and is sunk, an orientation and a pretilt angle of liquid crystal nearby the sunk region are different in a certain extent, which affects display quality of the liquid crystal display panel.

Technical Solution

To solve the above issue, the present invention provides technical solutions as follows:

A liquid alignment device comprises: a stage configured to carry a liquid crystal display panel, wherein a first substrate in the liquid crystal display panel is placed on the stage, a color resist layer and a pixel electrode of the liquid crystal display panel are located in a second substrate of the liquid crystal display panel; a curing light source configured to irradiate the first substrate along a direction from the first substrate to the second substrate to cure a pretilt angle of liquid crystal; and a probe configured to provide the first substrate with a curing voltage through an exposed electrode of the first substrate.

According to a preferred embodiment of the present invention, the curing light source is placed between the stage and the liquid crystal display panel.

According to a preferred embodiment of the present invention, the curing light source is displaced on the stage along a direction away from the liquid crystal display panel, and the stage is transparent.

According to a preferred embodiment of the present invention, the curing light source comprises a light guide plate and a plurality of ultraviolet sources, the light guide plate is configured to change an emission direction of ultraviolet light emitted by the ultraviolet sources such that the ultraviolet light irradiates the first substrate along the direction from the first substrate to the second substrate.

According to a preferred embodiment of the present invention, the ultraviolet sources are disposed on a periphery of the light guide plate.

According to a preferred embodiment of the present invention, the light guide plate comprises two light entering side surfaces and a light emitting surface between the two light entering side surfaces.

According to a preferred embodiment of the present invention, the ultraviolet sources are disposed on a bottom of the light guide plate.

According to a preferred embodiment of the present invention, a clamping device is disposed on a side of the stage, or two clamping devices are disposed respectively on two sides of the stage.

According to a preferred embodiment of the present invention, the clamping device comprises a base, a pad on a surface of the base, and two cushion plates disposed oppositely in a chamber body defined in the pad, and the cushion plates are configured to clamp two sides of an end of the liquid crystal display panel.

According to a preferred embodiment of the present invention, the probe is disposed on an inner edge of the chamber body of the pad.

A liquid alignment device comprises: a stage configured to carry a liquid crystal display panel, wherein a first substrate in the liquid crystal display panel is placed on the stage, a color resist layer and a pixel electrode of the liquid crystal display panel are located in a second substrate of the liquid crystal display panel; a curing light source comprising a light guide plate and a plurality of ultraviolet sources, wherein the light guide plate is configured to change an emission direction of ultraviolet light emitted by the ultraviolet sources such that the ultraviolet light irradiates the first substrate along the direction from the first substrate to the second substrate to cure a pretilt angle of liquid crystal; and a probe configured to provide the first substrate with a curing voltage through an exposed electrode of the first substrate.

According to a preferred embodiment of the present invention, the curing light source is placed between the stage and the liquid crystal display panel.

According to a preferred embodiment of the present invention, the curing light source is displaced on the stage along a direction away from the liquid crystal display panel, and the stage is transparent.

According to a preferred embodiment of the present invention, the ultraviolet sources are disposed on a periphery of the light guide plate.

According to a preferred embodiment of the present invention, I the light guide plate comprises two light entering side surfaces and a light emitting surface between the two light entering side surfaces.

According to a preferred embodiment of the present invention, the light entering side surfaces are planar surfaces.

According to a preferred embodiment of the present invention, the ultraviolet sources are disposed on a bottom of the light guide plate.

According to a preferred embodiment of the present invention, a clamping device is disposed on a side of the stage, or two clamping devices are disposed respectively on two sides of the stage.

According to a preferred embodiment of the present invention, the clamping device comprises a base, a pad on a surface of the base, and two cushion plates disposed oppositely in a chamber body defined in the pad, and the cushion plates are configured to clamp two sides of an end of the liquid crystal display panel.

According to a preferred embodiment of the present invention, the probe is disposed on an inner edge of the chamber body of the pad.

Advantages

Compared to the prior art, the liquid alignment device provided by the present invention adds the light guide plate in the curing light source, and the light guide plate converts point light sources emitted from the ultraviolet sources into an area light source to irradiate the first substrate of the liquid crystal display panel. The color resist layer is disposed on the second substrate of the liquid crystal display panel to avoid the issue that the second substrate needs to be disposed on a lower place and the first substrate needs to be disposed on an upper place during liquid alignment. Therefore, it is achieved that ultraviolet light does not pass through the color resist layer in the pixel in advance to prevent the ultraviolet sources from being absorbed by the color resist layer and effecting a reaction rate of the liquid alignment such that efficiency of the liquid alignment is improved. The liquid crystal display panel is fixed on a surface of the stage and two ends thereof are clamped in the clamping devices such that the liquid crystal display panel is disposed horizontally to prevent one end of the first substrate is sagged and curved to improve a yield rate of the liquid alignment and lower the manufacturing cost of the liquid crystal display panel.

DESCRIPTION OF DRAWINGS

To more clearly elaborate on the technical solutions of embodiments of the present invention or prior art, appended figures necessary for describing the embodiments of the present invention or prior art will be briefly introduced as follows. Apparently, the following appended figures are merely some embodiments of the present invention. A person of ordinary skill in the art may acquire other figures according to the appended figures without any creative effort.

DETAILED DESCRIPTION OF PREFERRED EMBODIMENTS

Figure 1:
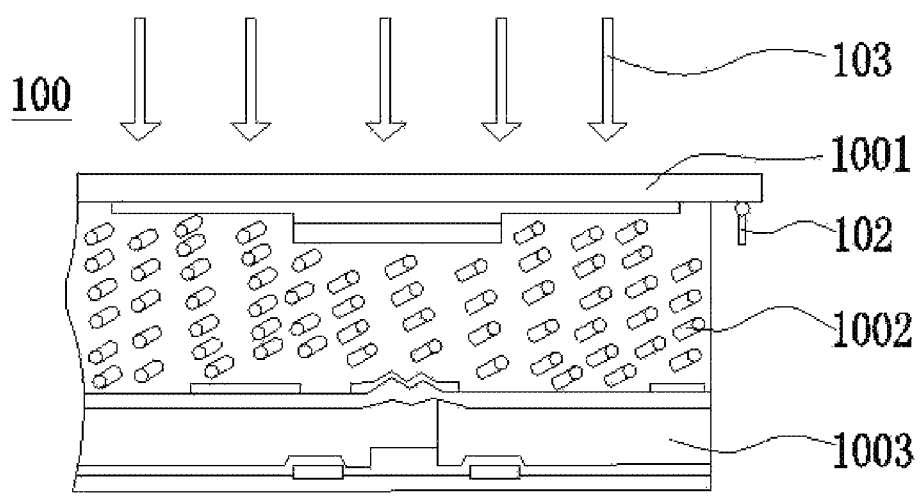
FIG. 1 is a schematic structural front view of liquid alignment of a conventional liquid crystal display panel.
Figure 2:
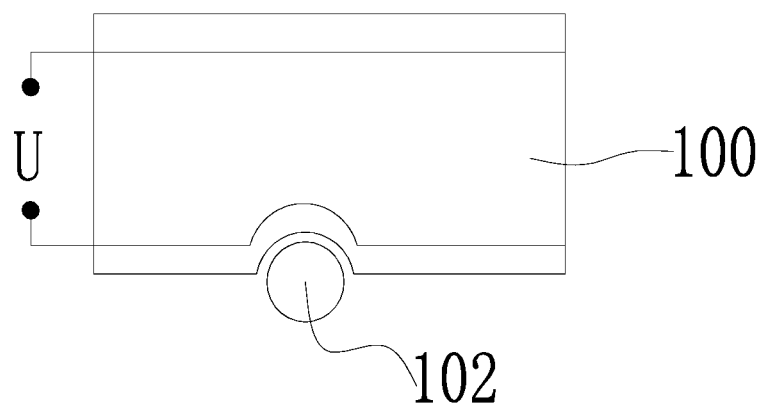
FIG. 2 is a schematic structural side view of liquid alignment of the conventional liquid crystal display panel.

Each of the following embodiments is described with appending figures to illustrate specific embodiments of the present invention that are applicable. The terminologies of direction mentioned in the present invention, such as "upper", "lower", "front", "rear", "left", "right", "inner", "outer", "side surface", etc., only refer to the directions of the appended figures. Therefore, the terminologies of direction are used for explanation and comprehension of the present invention, instead of limiting the present invention. In the figures, units with similar structures are marked with the same reference characters.

The present invention aims at the technical issue that due to a larger size, two ends of the liquid crystal display panel are sagged and curved, and especially, a portion of the liquid crystal display panel where the probe is located has a maximum amount of deformation and is sunk, an orientation and a pretilt angle of liquid crystal nearby the sunk region are different in a certain extent, which affects display quality of the liquid crystal display panel. The present embodiment can solve the defect.

Figure 3:
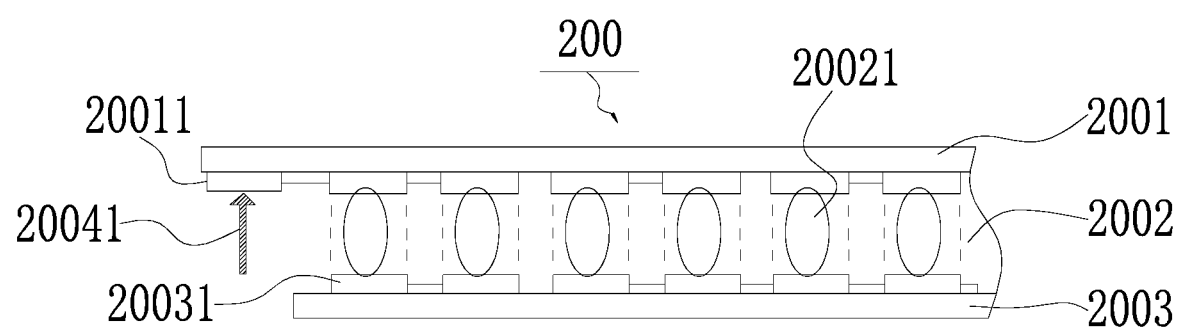
FIG. 3 is a schematic structural side view of a liquid crystal display panel provided by the embodiment of the present invention.

With reference to FIG. 3, FIG. 3 is a schematic structural side view of a liquid crystal display panel provided by the embodiment of the present invention. The liquid crystal display panel 200 comprises a first substrate 2001, a liquid crystal layer 2002, a second substrate 2003, an electrode and a chip-integrated circuit 20011 sandwiched between the first substrate 2001 and the liquid crystal layer 2002, and an electrode and a chip-integrated circuit 20031 sandwiched between the second substrate 2003 and the liquid crystal layer 2002. The first substrate 2001 is formed with a color filter layer and a driver circuit layer. The liquid crystal layer 2002 comprises a plurality of liquid crystal 20021. The second substrate 2003 is formed with a pixel electrode and a color resist layer. A length of the first substrate 2001 is greater than a length of the second substrate 2003. Therefore, step regions are formed respectively on two sides of the liquid crystal display panel 200, a common electrode 2041 on the step regions of the two sides can be deemed as the probe for exerting a predetermined voltage.

Figure 4:
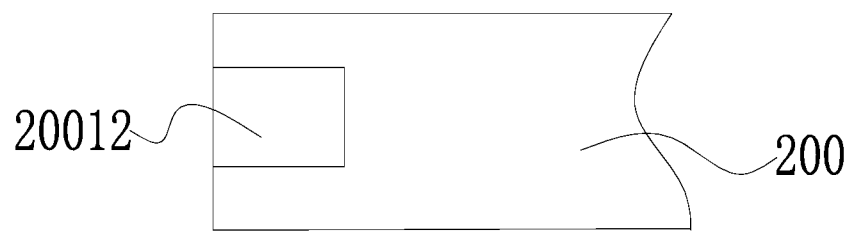
FIG. 4 is a schematic structural bottom view of a liquid crystal display panel provided by the embodiment of the present invention.

With reference to FIG. 4, FIG. 4 is a schematic structural bottom view of a liquid crystal display panel provided by the embodiment of the present invention. In the liquid crystal display panel 200, a laser is used to cut a side of the common electrode from a front surface of the first substrate 2001, and the exposed electrode region forms an exposed electrode 20012. When the liquid crystal layer 2002 is under alignment, the exposed electrode 20012 employs the probe to provide the first substrate 2001 in the liquid crystal display panel 200 with a predetermined voltage such each electrode is provided with a different electrical signal to facilitate curing of different electrode regions, chip-integrated circuit, and the sealant frame to improve production rate of the liquid crystal display panel 200.

Figure 5:
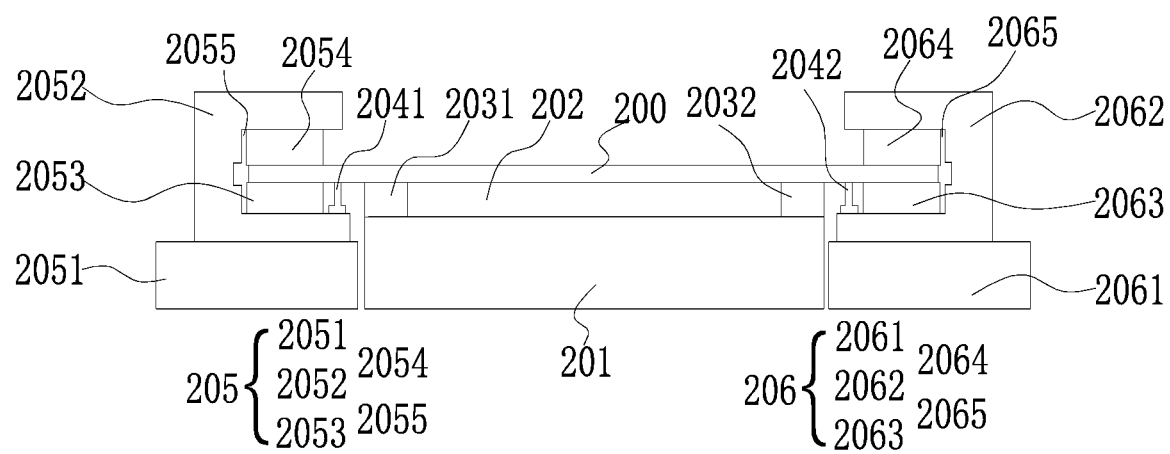
FIG. 5 is a schematic structural front view of a liquid alignment device provided by an embodiment of the present invention.
Figure 6:
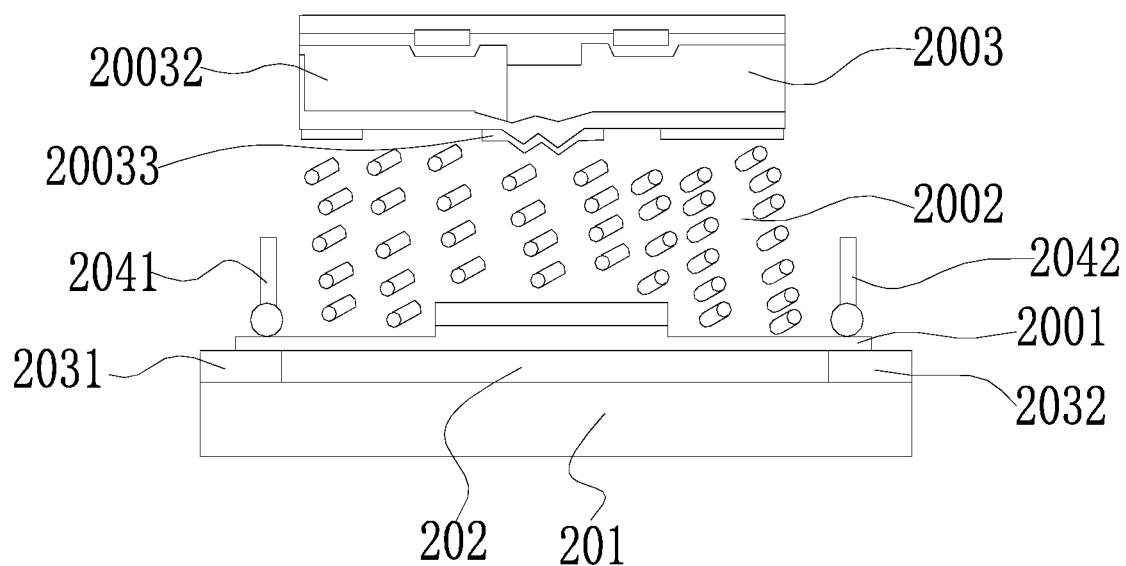
FIG. 6 is schematic structural partial front view of a liquid alignment device provided by the embodiment of the present invention.

With reference to FIGS. 5 and 6, the embodiment of the present invention provides a liquid alignment device comprising a stage 201 configured to carry the liquid crystal display panel 200. A first substrate 2001 in the liquid crystal display panel 200 is placed on the stage 201. A color resist layer 20032 and a pixel electrode 20033 in the liquid crystal display panel 200 is disposed in a second substrate 2003 of the liquid crystal display panel 200. A curing light source is configured to irradiate the first substrate 2001 along a direction from the first substrate 2001 to the second substrate 2003 to cure a pretilt angle of liquid crystal 20021. A probe is configured to provide the first substrate 2001 with a curing voltage through an exposed electrode 20012 of the first substrate 2001.

With reference to FIG. 6, curing light source is placed between the stage 201 and the liquid crystal display panel 200. The curing light source comprises a light guide plate 202 and a plurality of ultraviolet sources located on an outside of the light guide plate 202. The light guide plate 202 is configured to change an emission direction of ultraviolet light emitted by the ultraviolet sources such that ultraviolet light irradiates the liquid crystal display panel 200 along a front direction. In the liquid crystal display panel 200, the first substrate 2001 faces downward, and in the liquid crystal display panel 200, the second substrate 2003 faces upward.

Figure 7:
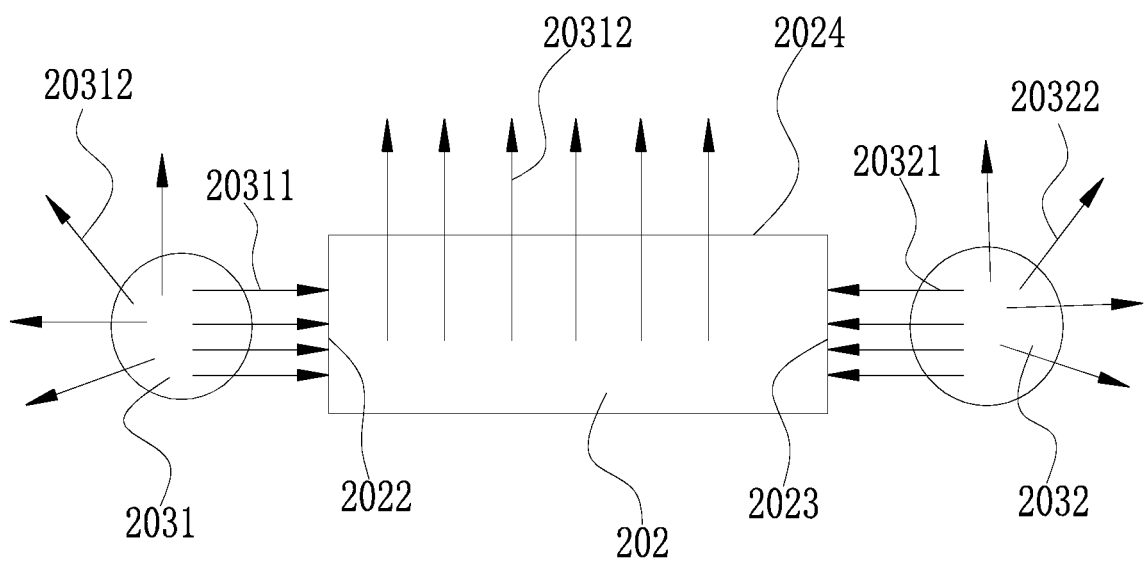
FIG. 7 is a schematic view of transmission direction of ultraviolet light of a liquid alignment device provided by the embodiment of the present invention.

With reference to FIG. 7, in the present embodiment, the ultraviolet sources comprise a first ultraviolet source 2031 and a second ultraviolet source 2032 disposed oppositely and respectively on two sides of the light guide plate 201. According to actual needs, the ultraviolet sources are disposed around the light guide plate 201, and a number of the ultraviolet sources can be plural.

A cross-section of the light guide plate 202 is rectangular, and the light guide plate 202 comprises a light entering side surface 2022 and a light entering side surfaces 2023, and a light emitting surface 2014 between the light entering side surface 2022 and the light entering side surface 2023. Both the light entering side surface 2022 and the light entering side surface 2023 are planar surfaces, and the first ultraviolet source 2031 and the second ultraviolet source 2032 are disposed on the outside of the light guide plate 202. The first ultraviolet sources 2031 and the second ultraviolet sources 2032 are preferably circular. The first ultraviolet sources 2031 and the second ultraviolet sources 2032 are configured to emit ultraviolet light, a part of the ultraviolet light directly irradiates regions of two ends of the liquid crystal display panel 200, for example, the ultraviolet light 20312 and the ultraviolet light 20322. Another part of the ultraviolet light irradiates the light entering side surfaces of the light guide plate 202, an incident of the ultraviolet light is changed by the light guide plate 202 for 90 degrees and then the ultraviolet light 20312 is emitted out from the light emitting surface 2024 to a middle region of the liquid crystal display panel 200, for example, the ultraviolet light 20311 and the ultraviolet light 20321.

a plurality of probes are disposed on an outside of the stage 201, and the probes are configured to provide an electrode 20012 in the liquid crystal display panel 200 with a predetermined voltage. In the present embodiment, the probes comprise a first probe 2041 and a second probe 2042. According to actual needs, a number of the probes is plural.

By a technology of the light guide plate 202, the point light source emitted by the ultraviolet sources is converted into an area light source, and upward vertically irradiates the first substrate 2001 of the liquid crystal display panel 200. In the meantime, both the color resist layer 20032 and the pixel electrode 20033 are used and disposed in the second substrate 2003 and such solution solves the technical issue that in the liquid crystal display panel 200 the second substrate 2003 is disposed on a lower place and the first substrate 2001 is disposed on an upper place necessarily. The liquid crystal display panel 200 sets the first substrate 2001 facing down, ultraviolet light does not pass through the pixel electrode 20033 and the color resist layer 20032 to prevent the ultraviolet light from being absorbed by the color resist layer 20032 in advance and to improve efficiency of the liquid alignment. The liquid crystal display panel 200 is fixed on a surface of the stage 201 and two ends thereof are clamped in the clamping devices such that the liquid crystal display panel 200 is disposed horizontally to prevent one end of the first substrate is sagged and curved to improve a yield rate of the liquid alignment of the liquid crystal 20021 and lower the manufacturing cost of the liquid crystal display panel. During alignment of the liquid crystal layer 2002, the exposed electrode 20012 employs the probe to provide substrate on the two sides of the liquid crystal layer 2002 in the liquid crystal display panel 200 with a predetermined voltage, and the ultraviolet light and the predetermined voltage are used to change orientations of the liquid crystal molecules in the liquid crystal layer 2002 such that the liquid crystal molecules of the liquid crystal layer 2002 are arranged along the predetermined pretilt angle neatly to achieve an objective of liquid alignment. Also, each electrode is applied with a different electrical signal to curing of different electrode regions, chip-integrated circuit, and the sealant frame to improve production rate of the liquid crystal display panel 200.

A clamping device is disposed on a side of the stage 201, or two clamping devices are disposed respectively on two sides of the stage 201. The clamping device is configured to support two sides of an end of the liquid crystal display panel.

With reference to FIG. 5, in the present embodiment, clamping devices are disposed oppositely on the two sides of the stage 201. A first clamping devices 205 comprises a first base 2051, a first horizontal U-shaped pad 2052 located on a surface of the first base 2051, and a first cushion plate 2053 and a second cushion plate 2054 in a first chamber body 2055 defined in the first horizontal U-shaped pad 2052. The first cushion plate 2053 and the second cushion plate 2054 respectively clamp the two sides of the liquid crystal display panel 200. The chamber body 2055 is a recess. An end portion of the liquid crystal display panel 200 has no contact with an adjacent edge of the first horizontal U-shaped pad 2052 to prevent damages to the liquid crystal display panel 200 due to contact of the end of the liquid crystal display panel 200 with the adjacent first horizontal U-shaped pad 2052.

The second clamping devices 206 comprises a second base 2061, a second horizontal U-shaped pad 2062 located on a surface of the second base 2061, and a third cushion plate 2063 and a fourth cushion plate 2064 in a second chamber body 2065 defined in the second horizontal U-shaped pad 2062. The third cushion plate 2063 and the fourth cushion plate 2064 respectively clamp the two sides of the liquid crystal display panel 200. The chamber body 2065 is a recess. An end portion of the liquid crystal display panel 200 has no contact with an adjacent edge of the second horizontal U-shaped pad 2062 to prevent damages to the liquid crystal display panel 200 due to contact of the end of the liquid crystal display panel 200 with the second horizontal U-shaped pad 2062.

Probes are disposed on an edge of the chamber body of the pad, and can be disposed on a surface of the liquid crystal display panel 200 or disposed in the liquid crystal display panel 200. Due to step regions formed by the step difference of the first substrate 2001 and the second substrate 2003, the first probe 2041 and the second probe 2042 in the present embodiment are disposed respectively inner edges of the first chamber body 2055 and the second chamber body 2065.

In the present embodiment, the clamping devices comprise a first clamping device 205 and a second clamping device 206. The first clamping device 205 and the second clamping device 206 respectively clamp the two ends of the liquid crystal display panel 200 and are fixed on the light guide plate 202. In the liquid crystal display panel 200, the first substrate 2001 faces downward, the second substrate 2003 faces upward, and both are disposed horizontally to prevent the two ends of the liquid crystal display panel 200 from being sagged and curved. The portions on the probes would not deform such that a yield rate of the liquid alignment of the liquid crystal display panel 200 is enhanced.

The present embodiment has no limit to the curing light source placed on the surface of the stage 201. When the stage 201 is transparent for ultraviolet light to pass therethrough without obstruction, the curing light source can also be placed right under the liquid crystal display panel 200 and be located under the stage 201.

The ultraviolet sources can be disposed on a bottom of the light guide plate 202, and emitted ultraviolet light enters the bottom of the light guide plate 202 and irradiates the first substrate 2001 of the liquid crystal display panel 200 from a surface of the light guide plate 202.

In the present invention, a light guide plate is added into the curing light source, and the light guide plate converts point light sources emitted from the ultraviolet sources into an area light source to irradiate the first substrate of the liquid crystal display panel. The color resist layer is disposed on the second substrate of the liquid crystal display panel to avoid the issue that the second substrate needs to be disposed on a lower place and the first substrate needs to be disposed on an upper place during liquid alignment. Therefore, it is achieved that ultraviolet light does not pass through the color resist layer in the pixel in advance to prevent the ultraviolet sources from being absorbed by the color resist layer and effecting a reaction rate of the liquid alignment such that efficiency of the liquid alignment is improved. The liquid crystal display panel is fixed on a surface of the stage and two ends thereof are clamped in the clamping devices such that the liquid crystal display panel is disposed horizontally to prevent one end of the first substrate is sagged and curved to improve a yield rate of the liquid alignment and lower the manufacturing cost of the liquid crystal display panel.

Although the preferred embodiments of the present invention have been disclosed as above, the aforementioned preferred embodiments are not used to limit the present invention. The person of ordinary skill in the art may make various changes and modifications without departing from the spirit and scope of the present invention. Therefore, the scope of protection of the present invention is defined by the scope of the claims.

What is claimed is:

1. A liquid alignment device, comprising:
    a stage configured to carry a liquid crystal display panel, wherein a first substrate in the liquid crystal display panel is placed on the stage, a color resist layer and a pixel electrode of the liquid crystal display panel are located in a second substrate of the liquid crystal display panel;
    a curing light source configured to irradiate the first substrate along a direction from the first substrate to the second substrate to cure a pretilt angle of liquid crystal; and
    a probe configured to provide the first substrate with a curing voltage through an exposed electrode of the first substrate.

2. The liquid alignment device as claimed in claim 1, wherein the curing light source is placed between the stage and the liquid crystal display panel.

3. The liquid alignment device as claimed in claim 1, wherein the curing light source is displaced on the stage along a direction away from the liquid crystal display panel, and the stage is transparent.

4. The liquid alignment device as claimed in claim 1, wherein the curing light source comprises a light guide plate and a plurality of ultraviolet sources, the light guide plate is configured to change an emission direction of ultraviolet light emitted by the ultraviolet sources such that the ultraviolet light irradiates the first substrate along the direction from the first substrate to the second substrate.

5. The liquid alignment device as claimed in claim 4, wherein the ultraviolet sources are disposed on a periphery of the light guide plate.

6. The liquid alignment device as claimed in claim 5, wherein the light guide plate comprises two light entering side surfaces and a light emitting surface between the two light entering side surfaces.

7. The liquid alignment device as claimed in claim 4, wherein the ultraviolet sources are disposed on a bottom of the light guide plate.

8. The liquid alignment device as claimed in claim 1, wherein a clamping device is disposed on a side of the stage, or two clamping devices are disposed respectively on two sides of the stage.

9. The liquid alignment device as claimed in claim 8, wherein the clamping device comprises a base, a pad on a surface of the base, and two cushion plates disposed oppositely in a chamber body defined in the pad, and the cushion plates are configured to clamp two sides of an end of the liquid crystal display panel.

10. The liquid alignment device as claimed in claim 9, wherein the probe is disposed on an inner edge of the chamber body of the pad.

11. A liquid alignment device, comprising:
    a stage configured to carry a liquid crystal display panel, wherein a first substrate in the liquid crystal display panel is placed on the stage, a color resist layer and a pixel electrode of the liquid crystal display panel are located in a second substrate of the liquid crystal display panel;
    a curing light source comprising a light guide plate and a plurality of ultraviolet sources, wherein the light guide plate is configured to change an emission direction of ultraviolet light emitted by the ultraviolet sources such that the ultraviolet light irradiates the first substrate along the direction from the first substrate to the second substrate to cure a pretilt angle of liquid crystal; and a probe configured to provide the first substrate with a curing voltage through an exposed electrode of the first substrate.

12. The liquid alignment device as claimed in claim 11, wherein the curing light source is placed between the stage and the liquid crystal display panel.

13. The liquid alignment device as claimed in claim 11, wherein the curing light source is displaced on the stage along a direction away from the liquid crystal display panel, and the stage is transparent.

14. The liquid alignment device as claimed in claim 11, wherein the ultraviolet sources are disposed on a periphery of the light guide plate.

15. The liquid alignment device as claimed in claim 14, wherein the light guide plate comprises two light entering side surfaces and a light emitting surface between the two light entering side surfaces.

16. The liquid alignment device as claimed in claim 15, wherein the light entering side surfaces are planar surfaces.

17. The liquid alignment device as claimed in claim 11, wherein the ultraviolet sources are disposed on a bottom of the light guide plate.

18. The liquid alignment device as claimed in claim 11, wherein a clamping device is disposed on a side of the stage, or two clamping devices are disposed respectively on two sides of the stage.

19. The liquid alignment device as claimed in claim 18, wherein the clamping device comprises a base, a pad on a surface of the base, and two cushion plates disposed oppositely in a chamber body defined in the pad, and the cushion plates are configured to clamp two sides of an end of the liquid crystal display panel.

20. The liquid alignment device as claimed in claim 19, wherein the probe is disposed on an inner edge of the chamber body of the pad.

* * * * *